Figure 1:
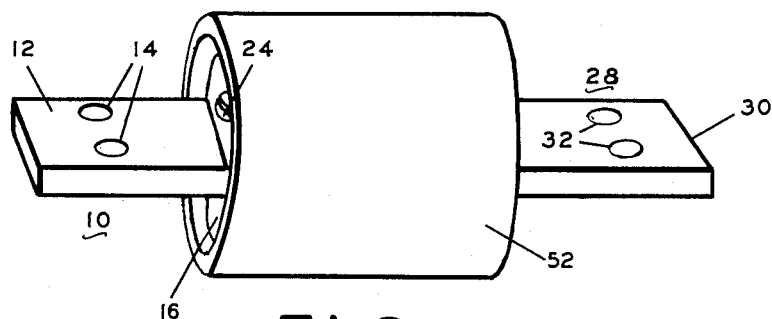

June 3, 1958     A. J. FISTER     2,837,614

PROTECTORS FOR ELECTRIC CIRCUITS

Filed Oct. 19, 1953     2 Sheets-Sheet 1

INVENTOR
Aloysius J. Fister
BY
Ray Eilers
ATTORNEY

June 3, 1958 A. J. FISTER 2,837,614
PROTECTORS FOR ELECTRIC CIRCUITS
Filed Oct. 19, 1953 2 Sheets-Sheet 2

INVENTOR
Aloysius J. Fister
BY Rey Eilers
ATTORNEY

United States Patent Office 2,837,614
Patented June 3, 1958

2,837,614

PROTECTORS FOR ELECTRIC CIRCUITS

Aloysius J. Fister, Vinita Terrace, Mo., assignor to McGraw-Edison Company, a corporation of Delaware Application October 19, 1953, Serial No. 386,919

18 Claims. (Cl. 200—120)

This invention relates to improvements in protectors for electric circuits. More particularly this invention relates to improvements in protectors for electric circuits which must interrupt heavy currents.

It is therefore an object of the present invention to provide an improved protector for electric circuits which can interrupt heavy currents.

It has become necessary, because of continuing developments in the art of generating and consuming electric power, to increase the currents which can safely be carried and interrupted by electric fuses. For example, it is presently desirable that electric fuses be available which can safely carry and interrupt current in the range of five thousand amperes; those fuses being able to carry their rated currents indefinitely but being able to interrupt currents that exceed the rated currents by predetermined amounts. Electric fuses which carry these heavy currents are customarily used in installations where they are rarely subject to "blowing" but where they must "blow" promptly when the current approaches dangerous values; and thus those fuses must remain unchanged until they "blow" to protect the circuit. This means that the active parts of the fuses must be protected against moisture, corrosive fumes, dirt, grit and other foreign matter which could adversely affect the operation of the fuses. The present invention protects the active parts of fuses by providing air-tight housings for those active parts; and those housings will effectively and continuously exclude moisture, corrosive fumes, dirt, grit and other foreign matter. It is therefore an object of the present invention to provide air-tight housings for the active parts of electric fuses.

Heretofore it has been thought necessary, by those skilled in the art, to vent the housings for electric fuses; the venting being intended to relieve the pressures that are created in the fuse housings when the active parts of the fuses "blow." However, the venting of fuse housings is undesirable because it can permit moisture, corrosive fumes, dirt, grit and other foreign matter to enter those housings and act upon the active parts of the fuses. In addition, the venting of fuse housings can also be objectionable since the heavy pressures and the heavy arcs, that can be experienced when these heavy currents are interrupted, might cause hot gases and flame to issue from the vents in the fuse housing; and that would, of course, be objectionable. The present invention provides a ventless fuse housing and thus avoids the entry of moisture, corrosive fumes, dirt, grit and other foreign matter while also avoiding the issuance of hot gases and flame. It is therefore an object of the present invention to provide a ventless housing for fuses.

The fuse housing provided by the present invention is made ventless by using a tube of air-impervious material, by providing air-impervious terminals, and by grooving those terminals and squeezing O-rings in the grooves in those terminals. The O-rings will fit within the grooves but will have their outer peripheries projecting radially outwardly beyond the walls of those grooves; and those outer peripheries will engage and be tightly squeezed against the inner surface of the tube. The tight engagement between the O-rings and the inner surface of the tube will coact with the air-impervious nature of the tube and terminals to make the fuse housing ventless. It is therefore an object of the present invention to provide a ventless fuse housing that has a tube of air-impervious material, air-impervious terminals and O-rings that fit in grooves in the terminals and are squeezed against the inner surface of the tube.

The casing, or tube, of the fuse housing provided by the present invention, will have a smoothly finished inner surface; and it will have the outer ends of that casing extending beyond the grooves in the terminals. As a result, the O-rings in the grooves of the terminals will engage the smoothly finished inner surface of that casing rather than the cut ends of that casing. Those cut ends will inevitably have irregularities and minute cracks, and thus can not assure a good seal; but the smoothly finished inner surface of the casing will be free of such irregularities and cracks and will provide a good seal with the O-rings. Moreover, the fasteners for the casing and terminals, and the openings for those fasteners, will be disposed axially outwardly of the grooves and O-rings. As a result, any leakage of air that might occur through those openings will not affect the ventless character of the fuse housing provided by the present invention. It is therefore an object of the present invention to provide annular grooves in the terminals of a fuse, to provide O-rings in those grooves, to provide a smooth finish on the inner surface of the casing for the fuse, and to dispose the fasteners for the casing and terminals axially outward of said O-rings and grooves.

The fuse provided by the present invention has two large and massive terminals. These terminals have massive securing portions and have massive discs extending radially from those securing portions. The discs have a plurality of small fusible links soldered to them; the links being connected in parallel with each other. Each of the links has two weak spots in it, and those weak spots will be closer to the large and massive terminals than they are to each other. Such an arrangement enables the terminals to absorb some of the heat generated by the weak spots, and thus enables those terminals to retard the rate of temperature rise of the fuse links. On transient loads that are considerably above the rated load of the fuse, the heat conducting ability of the fuse links will be insufficient to prevent fusing of those links; but on long continued loads of lesser intensity, the heat conducting ability of the fuse links will enable those links to conduct appreciable amounts of heat from the weak spots to the terminals. This conduction of heat prevents needless "blowing" of the fuse, and it also provides a desirable amount of time lag. It is therefore an object of the present invention to provide large and massive terminals for electric fuses, and to interconnect those terminals by parallel-connected fuse links of small cross section.

One of the weak spots in each of the links of the fuse provided by the present invention is overlain by a material that can alloy readily with the metal of the link. As long as the fuse is carrying its rated load, or is carrying lesser loads, the alloying material will not alloy with the metal of the link to any appreciable extent. However, when the load on the fuse exceeds the rated load by a predetermined amount, the temperature of the fuse links will rise to the point where appreciable alloying action will occur. The portions of the fuse links that will have been converted to an alloy by the alloying action will have higher electrical resistivities than the other portions of those links will have; and these higher resistivities will lead to increased heating of the alloyed portions. This increased heating enhances further alloying action of the portions of the links that are overlain by the alloying material; and this leads to further increases in electrical resistivity and thus to further increases in the heating of those overlain portions. The net result is that the fuse links "blow" promptly and protect the circuit against dangerous overloads. The combination of the massive terminals and the alloy-coated fuse links avoids needless "blows," provides time lag for lower overloads, and provides prompt "blowing" on excessive overloads.

The tubular casing of the fuse, provided by the present invention, is secured to the terminals of that fuse by fasteners. Those fasteners, which will preferably be screws, are set in openings that are spaced circumferentially around the casing adjacent the ends of that casing. The openings in the casing will register with correspondingly circumferentially spaced openings in the terminals; and the fasteners will seat in the openings in the terminals. The openings and fasteners are so spaced that none of them is in register with the end faces of the securing portions of the terminals and are so spaced that none of them is in register with a center line perpendicular to the side faces of those securing portions of the terminals. This is desirable since it enables the fuses to be placed in bus bar arrangements, where the bus bars are set in edge-to-edge or face-to-face alignment, without establishing short and direct paths between "live" portions of adjacent fuses across which electrical sparks could jump. If an electrical spark were to jump between adjacent fuses provided by the present invention, that spark would have to follow a path that is longer than the direct line distance between the casings of those fuses; and thus there is less risk of such a spark jumping. It is therefore an object of the present invention to provide an electric fuse wherein the casing is secured to the terminals by fasteners which are spaced out of register with the end faces, and out of register with a center line normal to the side faces of the securing portions of those terminals.

The length of the path between the "live" parts of adjacent fuses provided by the present invention can be further increased by providing a covering of insulation for the fasteners of those fuses. Where this is done, an electrical spark would have to jump between the terminals themselves; and such a jump would be longer and would require a higher voltage. In addition, the ends of the casings, for the fuses provided by the present invention, will not only extend axially beyond the grooves in the terminals but will also extend axially beyond the discs of those terminals; and thus an electric spark can not jump directly from the outer periphery of the disc of one terminal to the outer periphery of the disc of the terminal of an adjacent fuse. Instead, that electric spark would have to jump between portions of the said discs that are spaced inwardly from the peripheries of those discs; and this would mean a longer jump and would require a higher voltage.

The discs of the fuse terminals provided by the present invention, have a plurality of straight, spaced-apart grooves in them. The grooves in the discs will be registerable with each other; and the fuse links will extend between and seat in the said grooves. The fact that the grooves are straight and are registerable with each other facilitates the alignment of the fuse links relative to each other and relative to the terminals; and it also facilitates alignment of the fastener-receiving openings in the discs with each other and with the corresponding openings in the casing. This enables the fuse links to be assembled with the discs and enables the links and discs to be assembled with the casing without creating internal stresses in the fuse links. Moreover, the grooves in the discs enable solder to engage the walls of the grooves and to engage the end faces and part of the side and edge faces of the fuse links and provide a high conductivity bond between the grooves in the discs and the fuse links. It is therefore an object of the present invention to provide fuse terminals that have straight, spaced apart grooves that are registerable with each other and that can receive the ends of the fuse links.

The fuse links, in the fuse provided by the present invention, will be enclosed by the casing of that fuse and will be covered with arc-quenching filler; but until the terminals and links are telescoped within that casing, those links are open to view. Thus the assembled links and terminals can be given visual and electrical inspections before they are placed in the casing of the fuse; and thus a better and more uniform product is attainable. In addition, the fact that the body of arc-quenching material engages all of the fuse links, enables that material to constitute a large absorbing mass which can absorb the heat and vapor that will be generated when the fuse "blows." Moreover, that arc-quenching material will facilitate the equalization of local pressures generated as the fuse "blows."

Other and further objects and advantages of the present invention should become apparent from an examination of the drawing and accompanying description.

In the drawing and accompanying description two preferred forms of the present invention are shown and described but it is to be understood that the drawing and accompanying description are for the purpose of illustration only and do not limit the invention and that the invention will be defined by the appended claims.

Figure 2:
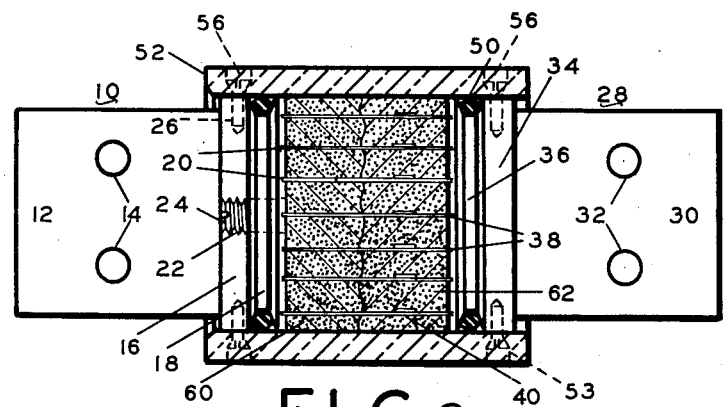
Figure 3:
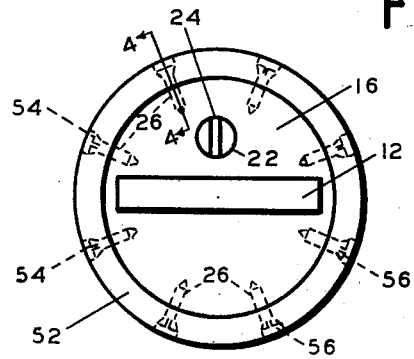
Figure 4:
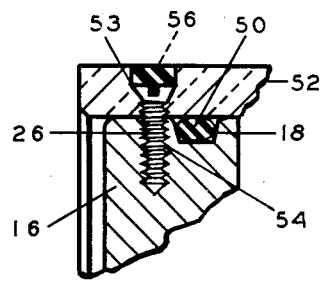
Figure 6:
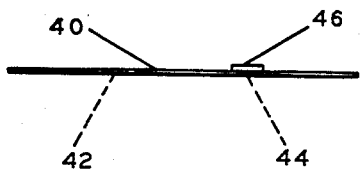
Figure 5:
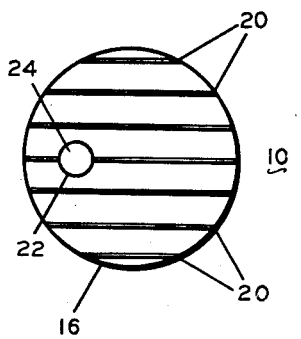
Figure 7:
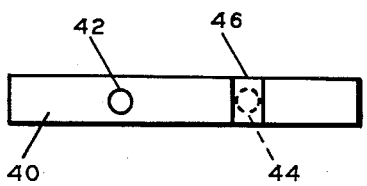
Figure 8:
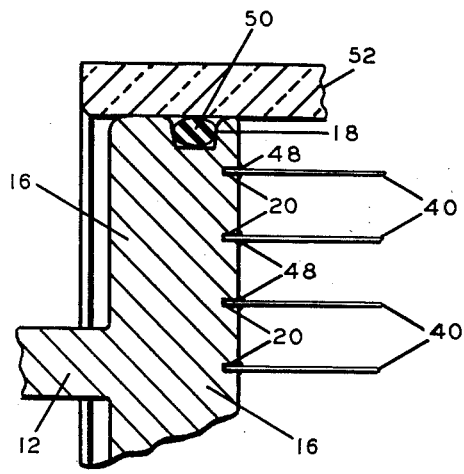

In the drawing Fig. 1 is a perspective view of one preferred form of protector for electric circuits that is made in accordance with the principles and teachings of the present invention, Fig. 2 is a plan view in section of the protector shown in Fig. 1, Fig. 3 is an end view of the protector shown in Figs. 1 and 2, Fig. 4 is an enlarged sectional view of a portion of the protector of Figs. 1–3 and it is taken along the plane indicated by the line 4—4 in Fig. 3, Fig. 5 is an end elevational view of one of the terminals of the protector of Figs. 1–4, Fig. 6 is a side elevational view of one of the fuse links of the protector provided by the present invention, Fig. 7 is a plan view of the fuse link of Fig. 6, Fig. 8 is another enlarged cross sectional view of another portion of the protector of Figs. 1–4, and Fig. 9 is an enlarged view of another form of the protector for electric circuits provided by the present invention.

Referring to the drawing in detail, the numeral 10 generally denotes one of the terminals of a protector for electric circuits that is made in accordance with the principles and teachings of the present invention. That terminal includes a flat securing portion 12 and a transversely directed disc portion 16. The terminal 10 is preferably made as a casting, and it will be quite large and massive. The securing portion 12 has openings 14 therethrough which can receive bolts to secure it to a bus bar or other conductors. The disc portion 16 is cylindrical in form and it has a number of straight, spaced apart grooves 20 in the inner face thereof. These grooves are spaced equally apart and extend across substantially the entire area of the face of the disc portion 16. The grooves 20 are U-shaped in cross section and are deeper than they are wide. The disc portion 16 has an annular groove 18 at the periphery thereof and that groove is substantially U-shaped, but the walls of the groove are inclined outwardly from each other. A threaded opening 22 is provided in the disc portion 16 and a threaded plug 24 normally occupies and seals the opening 22. The plug has a recess therein to receive the blade of a screw driver.

The numeral 28 generally denotes the other terminal of the protector provided by the present invention, and that terminal is substantially identical with the terminal 10. The terminal 28 has a securing portion 30 which is identical to the securing portion 12, it has openings 32 which are identical to the openings 14, and it has a disc portion 34 which is similar to the disc portion 16. The disc portion 34 of the terminal 28 does not have a threaded opening therethrough, as does the disc portion 16. However, the disc portion 34 does have an annular groove 36 which is comparable to the annular groove 18, and it does have straight grooves 38 which are comparable to the straight grooves 20 of the terminal 10. The spacing between the straight grooves 20 is the same as the spacing between the straight grooves 38 of the terminal 28, ing between the straight grooves 38 of the terminal 28, and the grooves can thus be placed in registry with each other.

A plurality of fusible links 40 are provided for the protector of the present invention, and the ends of those fusible links extend into the grooves 20 and 38 of the terminals 10 and 28. The links are wide and thin and will have their ends fitting neatly within the grooves 20 and 38. Each of the fusible links 40 has an opening 42 which creates a weak spot and a second opening 44 which creates a weak spot. The fusible links will be made of metals that have low resistivities but when can fuse readily when heated to their melting point. One metal that has been found to be useful is silver. A mass of metal 46 which can alloy readily with the metal of the fuse links 40 is provided adjacent the openings 44 in those fuse links. This mass of alloy will overlie and close the openings 44. One metal that has been found to be very useful is tin.

The alloy 46 will replace the metal which was removed from the links when the openings 44 were formed, and thus the links adjacent the alloy 46 will normally have low resistivities. However, at elevated temperatures, the alloy will tend to combine with the metal of the links and form a new alloy which will have a higher resistivity than the metal of the links or the metal of the mass 46. This new alloy will increase the heat generating capacity of the fuse links and will in turn foster the alloying action. This enhanced alloying action will lead to further increases in the resistivity of the portions of the link adjacent the openings 44 and will lead to prompt "blowing" of the links 40. However, when the fuse links 40 are carrying their rated loads, there will be little or no alloying action between the mass 46 and the metal of the links 40.

The ends of the fuse links 40 are dimensioned to fit within and to receive some mechanical support from the walls of the straight grooves 20 and 38. There is sufficient clearance between the ends of the fuse links 40 and the walls of the grooves 20 and 38 to permit molten solder to flow around and to engage the ends and a part of the sides and edges of the fuse links 40. This solder will also engage the bottoms and side walls of the grooves 20 and 38 and will also flow over part of the face of the discs 16 and 34 of the terminals 10 and 28. This solder will provide a high conductivity bond between the terminals 10 and 28 and the fuse links 40.

The solder is denoted by the numeral 48 and it connects the fuse links in parallel relation with each other, and it also mechanically bonds the terminals 10 and 28 to the fuse links 40. The fuse links 40 will be flat and they will fit into the grooves 20 and 38 without distortion and without the creation of internal stresses. These links will resist relative rotation of the discs 16 and 34 of the terminals 10 and 28 and will hold those discs in register with each other.

Each of the discs 16 and 34 has circumferentially spaced recesses 26 in the periphery thereof and those recesses are threaded. The spacing between the threaded recesses 26 in the disc portions 16 and 34 is quite large, and this is very desirable because it obviates a situation where an assembler could rotate the terminals 10 and 28 slightly relative to each other to make the openings for recesses 26 in the terminals 10 and 28 register with each other. Those openings or recesses will be in register initially, and if the assembler were to try to rotate the terminals 10 and 28 to place other of those openings or recesses in register with each other, the large spacing between those openings or recesses would require such a twisting of the fuse links 40 that the assembler would immediately realize that the attempted rotation of the terminals was not proper. Thus, this wide spacing of the threaded recesses 26 avoids misalignment of the terminals 10 and 28 by assemblers.

O-rings 50 are disposed within the annular grooves 18 and 36 of the terminals 10 and 28. These O-rings fit within those grooves but they have their outer peripheries extending radially outwardly beyond the walls of those grooves. The O-rings 50 will be of resilient material, such as rubber or synthetic rubber, and they can be compressed. A casing 52 of tubular form is dimensioned so its internal diameter is less than the normal outer, unstressed diameter of the O-rings 50, and thus when the casing 52 is telescoped over the terminals 10 and 28 that casing will squeeze and compress the O-rings 50. The squeezed and compressed condition of the O-rings 50 is indicated particularly in Figs. 4, 8 and 9; and when the O-rings are compressed in this manner, they will coact with the terminals 10 and 28 and with the casing 52 to provide an air-tight seal.

The casing 52 is preferably formed of a sturdy, heat resistant and moisture resistant material. While a number of different materials can be used, it is preferred to use a glass melamine. This material consists of a fabric woven from glass fibres which is thereafter impregnated with melamine. The ends of the casing 52 are cut to provide the desired length of casing, and those ends will have irregularities and minute cracks. However, the inner surface of the casing 52 will be ground to a smooth finish and will be free of irregularities and cracks. Such a smoothly ground surface will coact with the O-rings 50 to provide a positive seal against the ingress of moisture, corrosive fumes, dirt, grit and other foreign matter and will also provide a positive seal against the egress of flame and hot gases. The ends of the casing 52 have a slight chamfer at their inner peripheries to facilitate the squeezing and compressing of the O-rings 50.

The casing 52 has a plurality of circumferentially spaced, countersunk openings 53 adjacent the opposite ends thereof. These openings 53 are complementary to and are in register with the threaded recesses 26. Fasteners 54, such as screws, can pass through the countersunk openings 53 in the casing 52 and can seat in the threaded recesses 26. As brought out hereinabove, the straight grooves in the discs are registerable with each other to facilitate the alignment of the fastener-receiving openings in the discs with each other and with the corresponding openings in the casing; and the assembler need only place the grooves 20 and 38 in register with each other, insert the ends of the links 40 in those grooves, and solder those ends to the discs 16 and 34 to cause those links to coact with those grooves to hold the openings 26 in the supporting portions 16 and 34 in alignment with the openings 53 in the housing. The countersunk openings 53 will be formed so they are in register with the threaded recesses 26, whereby the assembly of the terminals 10 and 28 with the casing 52 is facilitated and simplified. All that need be done is to line up the openings or recesses 26 in one of the terminals 10 or 28 with the openings 53 in the casing 52 and then telescope the casing 52 over the disc portions 16 and 34 of the terminals 10 and 28. Thereafter, it is only a matter of inserting the fasteners 54 in the openings therefor and tightening those fasteners.

Figure 9:
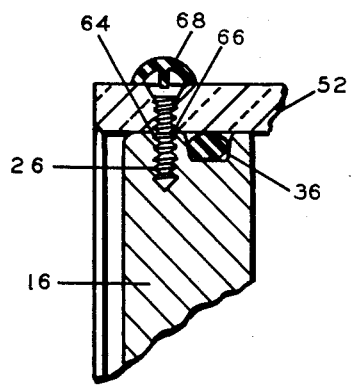

The countersunk openings 53 permit the heads of the fasteners 54 to extend inwardly of the outer periphery of the casing 52. The space in the countersunk openings 53 that is outwardly of the heads of the fasteners 54 can be filled by plugs 56 of insulating material. Where this is done, the surface of the casing 52 is continuous and is free of "live" parts. If desired, the countersunk openings in the casing 52 can be shallower, as indicated by Fig. 9. In that case the opening is denoted by the numeral 64 and the fastener is indicated by the numeral 66. The head of the fastener 66 will extend radially outwardly beyond the periphery of the casing 52, but it can have a coating 68 of insulation thereon. Here again, the surface of the casing 52 will be free of "live" parts. If desired, tape could be substituted for the coating 68. In many instances it will not be necessary to cover or insulate the fasteners 54 and 66, and in those cases a part of the exterior of the casing will be "live." However, the spacing of the openings 53 and 64 in the casing 52 is such that no fastener is in register with the side edges of the securing portions 12 and 30 of the terminals 10 and 28, and no fastener is in register with a line that is perpendicular to the side faces of the securing portions 12 and 30 of the terminals 10 and 28. Consequently, fuses that have "live" parts at the surface of their casings 52 can still be used in bus bar arrangements where the bus bars are aligned in edge-to-edge and face-to-face relation.

A vapor-yielding arc quenching material of small particle size is denoted by the numeral 62 and it fills approximately one half of the interior of the fuse housing. The other half of the interior of the fuse housing is filled with an inert arc-quenching material of small particle size that can fuse in the presence of an electrical arc. Such a filler material is denoted by the numeral 60 and it engages the ends of the fuse links 40 which have the openings 42 therein. The filler 62 engages the portions of the fuse links 40 which have the openings 44 therein and which have the alloying metal 46 thereon.

In assembling the protector provided by the present invention, the fuse links 40 are inserted in the straight grooves 20 and 38 of the terminals 10 and 28 and are soldered in position. Thereafter, the assembly of the terminals 10 and 28 and the fuse links 40 is given a through visual and electrical inspection and test. Once this has been done, the O-rings 50 are slipped into the annular grooves 18 and 36 and then the casing 52 is telescoped over the discs 16 and 34 and the fuse links 40. The protector then has the fasteners 54 or 66 inserted through the openings 53 or 64 in the casing 52 and seated in the threaded recesses 26 in the discs 16 and 34 of the terminals 10 and 28. Thereafter, the protector is set so the terminal 10 is up and the plug 24 is removed. The filler material 62 is then introduced into the interior of the protector through the threaded opening 22 until the level of that filler is above the alloying metal 46 adjacent the openings 44 in the links 40. A vibrating action is applied to the protector during the filling operation so that the filler material is compact and dense. Once the level of the filler material 62 has reached the approximate center of the fuse housing, the filler 60 is introduced into that housing. The vibrating action is continued so that all parts of the housing will be completely full of the filler materials 62 and 60. A number of different filler materials can be used for the filler 62, but plaster of Paris has been found to be very acceptable and useable. A number of different filler materials could be used for the filler 60, but quartz sand, aluminum silicate, Rottenstone, and silica gel have proven to be very useful.

When the protector provided by the present invention is connected in a circuit, as by having the securing portions 12 and 30 of the terminals 10 and 28 connected to terminals of that system, current will flow from the terminal 10 to the fuse links 40 and thence to the terminal 30, or vice versa. The solder 48 will provide a high conductivity junction between the fuse links 40 and the terminals 10 and 28 and thus the overall resistance of the fuse will be small. As long as the fuse carries only its rated load, or lesser loads, there will be no appreciable alloying between the metal 46 and the metal of the fuse links 40. However, when the fuse must carry heavy overloads, the heat generated by the fusible links 40 will be sufficient to cause the metal 46 to begin to alloy with the metal of the fusible links 40, and the resulting alloy will have a higher resistivity than the metal 46 or the metal of the links 40. This higher resistivity will increase the heating effect of the fuse links 40 and that increased heating effect will in turn enhance further alloying action. The net result is that the fuse links 40 will "blow" promptly and thus avoid damage due to the heavy overloads.

The fuse provided by the present invention can withstand transient overloads of moderate intensity for short periods of time because the terminals 10 and 28 are massive and will absorb heat from the fuse links 40. This heat absorbing effect is fostered by having the openings 42 and 44 of the fuse links 40 closer to the terminals 10 and 28 than they are to each other. This heat absorbing effect will provide a desirable time lag and will avoid needless "blowing" of the fuse, but it will not interfere with prompt "blowing" of the fuse when excessive overloads are experienced; the heat conducting ability of the fusible links 40 being insufficient to avoid "blowing" of the fusible links at such overloads.

On short circuits, the fusible elements 40 will "blow" at the openings 42. On overloads below short circuit intensity, the fusible elements 40 will "blow" by having the metal 46 alloy with the metal of the elements 40 at the opening 44. When the fusible elements "blow" the filler 60 will tend to melt and thus absorb heat from the arcs that will form in the casing 52. The filler material 62 will tend to yield an arc-quenching vapor. The combined action of the two filler materials assures prompt and safe extinction of the arcs.

The heavy values of current that will be interrupted by these protectors for electric circuits can lead to the creation of heavy pressures and considerable flame during the "blowing" of the fuse. These pressures will be confined and the flames will be confined within the fuse housing. However, those pressures will be absorbed to at least a limited extent by the local distortion of the O-rings 50 in the annular grooves 18 or 36. Those O-rings will be forced against those walls of the grooves 18 and 36 which are most distant from the center of the fuse housing and they will tend to be squeezed into the small tolerance between the periphery of the discs 16 and 34 and the inner surface of the casing 52. The initial squeezing and compressing of the O-rings 50 is such that those O-rings will maintain an air-tight seal with the inner surface of the casing as they are forced against the said walls of the grooves; but in moving against those walls those O-rings will absorb some of the pressures created when the fuses "blow."

The filler materials 60 and 62 will constitute a large absorbent mass which can absorb heat and vapors. As a result, those filler materials will equalize local pressures in the fuse housing and will tend to hold the average pressure levels in the housing to manageable levels.

The active parts of the protector provided by the present invention are fully protected against moisture, corrosive fumes, dirt, grit and other foreign matter that would tend to find its way into the fuse housing. The O-rings provide an air-tight seal, and the casing 52 and the terminals 10 and 28 are themselves air-impervious. The openings 53 and 64 in the casing 52 are located axially outwardly of the O-rings 50 and thus any leakage which could occur through those openings will not permit moisture, corrosive fumes, dirt, grit and other foreign matter to enter the portion of the fuse housing where the active parts of the fuse are located.

It will be noted that the protector provided by the present invention does not have a metal cap which extends over the exterior of the casing 52. This avoids the presence of a large "live" mass on the exterior of the casing and in addition it avoids heating due to inductive effect. While metal casings are not objectionable at many current frequencies, they can become very objectionable when the frequencies are in excess of four hundred cycles per second. By use of the present invention, it is possible to make protectors for electric circuits which can be installed in circuits that will one day be converted to high frequency use.

Whereas two preferred forms of the present invention have been shown and described it should be apparent to those skilled in the art that various changes may be made in the form of the invention without affecting the scope thereof.

What I claim is:

1. A protector for electric circuits that comprises a housing with a longitudinally extending axis, a plurality of fusible elements of electrically conducting material, a terminal of electrically conducting material that is positioned at one end of said housing, said terminal having a portion that supports the ends of said plurality of fusible elements and also having a portion that projects outwardly from said supporting portion and is securable into an electric circuit, said supporting portion of said terminal extending into said one end of said housing and having a face that communicates with the interior of said housing, said face of said supporting portion of said terminal being substantially perpendicular to said axis, a plurality of elongated narrow grooves in said face of said supporting portion of said terminal, said grooves being spaced apart, a second terminal of electrically conducting material that is positioned at the opposite end of said housing, said second terminal having a portion that supports the opposite ends of said plurality of fusible elements and also having a portion that projects outwardly from said supporting portion and is securable into said electric circuit, said supporting portion of said second terminal extending into the opposite end of said housing and having a face that communicates with the interior of said housing, said face of said supporting portion of said second terminal being substantially perpendicular to said axis, a plurality of elongated narrow grooves in said face of said supporting portion of said second terminal, the grooves in said face of said supporting portion of said second terminal being spaced apart, the grooves in said face of said supporting portion of said second terminal being similar to and being registerable with the grooves in the face of said supporting portion of the first said terminal, said fusible elements being wide and thin whereby the ends of said fusible elements extend within and are confined and guided by said elongated narrow grooves in said faces of said supporting portions of said terminals, and solder that electrically bonds said fusible elements directly to said terminals.

2. A protector for electric circuits that comprises a housing with a longitudinally extending axis, a plurality of fusible elements of electrically conducting material, a terminal of electrically conducting material that is positioned at one end of said housing, said terminal having a portion that supports the ends of said plurality of fusible elements and also having a portion that projects outwardly from said supporting portion and is securable into an electric circuit, said supporting portion of said terminal extending into said one end of said housing and having a face that communicates with the interior of said housing, said face of said supporting portion of said terminal being substantially perpendicular to said axis, a plurality of elongated narrow grooves in said face of said supporting portion of said terminal, said grooves being spaced apart, a second terminal of electrically conducting material that is positioned at the opposite end of said housing, said second terminal having a portion that supports the opposite ends of said plurality of fusible elements and also having a portion that projects outwardly from said supporting portion and is securable into said electric circuit, said supporting portion of said second terminal extending into the opposite end of said housing and having a face that communicates with the interior of said housing, said face of said supporting portion of said second terminal being substantially perpendicular to said axis, a plurality of elongated narrow grooves in said face of said supporting portion of said second terminal, the grooves in said face of said supporting portion of said second terminal being spaced apart, the grooves in said face of said supporting portion of said second terminal being similar to and being registerable with the grooves in the face of said supporting portion of the first said terminal, said fusible elements being wide and thin whereby the ends of said fusible elements extend within and are confined and guided by said elongated narrow grooves in said faces of said supporting portions of said terminals, solder that electrically bonds said fusible elements directly to said terminals, said housing enclosing said fusible elements and also enclosing said supporting portions of said terminals, and registerable openings in said housing and in said supporting portions of said terminals to receive fasteners, said fusible elements coacting with said registerable grooves in said faces of said supporting portions of said terminals to hold the openings in said supporting portions of said terminals in alignment with the openings in said housing.

3. A protector for electric circuits that comprises a housing with a longitudinally extending axis, a plurality of fusible elements of electrically conducting material, a terminal of electrically conducting material that is positioned at one end of said housing, said terminal having a portion that supports the ends of said plurality of fusible elements and also having a portion that projects outwardly from said supporting portion and is securable into an electric circuit, said supporting portion of said terminal extending into said one end of said housing and having a face that communicates with the interior of said housing, said face of said supporting portion of said terminal being substantially perpendicular to said axis, a plurality of elongated narrow grooves in said face of said supporting portion of said terminal, said grooves being spaced apart, a second terminal of electrically conducting material that is positioned at the opposite end of said housing, said second terminal having a portion that supports the opposite ends of said plurality of fusible elements and also having a portion that projects outwardly from said supporting portion and is securable into said electric circuit, said supporting portion of said second terminal extending into the opposite end of said housing and having a face that communicates with the interior of said housing, said face of said supporting portion of said second terminal being substantially perpendicular to said axis, a plurality of elongated narrow grooves in said face of said supporting portion of said second terminal, the grooves in said face of said supporting portion of said second terminal being spaced apart, the grooves in said face of said supporting portion of said second terminal being similar to and being registerable with the grooves in the face of said supporting portion of the first said terminal, said fusible elements being wide and thin whereby the ends of said fusible elements extend within and are confined and guided by said elongated narrow grooves in said faces of said supporting portions of said terminals, and solder that electrically bonds said fusible elements directly to said terminals, said housing enclosing said fusible elements and said faces of said supporting portion of said terminals, said solder engaging said fusible elements and said faces of said supporting portions of said terminals and coacting with the spacing of said grooves in said faces of said supporting portions of said terminals to facilitate inspection of all of said fusible elements and of the soldered joints between them and said faces of said supporting portions of said terminals before said fusible elements are enclosed within said housing.

4. A protector for electric circuits that comprises a tubular casing, which has smooth, cylindrical interior surfaces at the ends thereof, a terminal of electrically conducting material for said protector that has a disc thereon disposable within one end of said tubular casing and in register with one of said smooth, cylindrical interior surfaces, a second terminal of electrically conducting material for said protector that has a disc thereon disposable within the other end of said tubular casing and in register with the other of said smooth, cylindrical interior surfaces, and a plurality of fusible elements of electrically conducting material extending between and connected to said discs of the first said and said second terminals, a yielding seal between the periphery of the first said disc and the said one smooth, cylindrical interior surface of said tubular casing, and a yielding seal between the periphery of the second said disc and the said other smooth, cylindrical interior surface of said tubular casing.

5. A protector for electric circuits that comprises a tubular casing, a terminal of electrically conducting material for said protector that has a disc thereon disposable within one end of said tubular casing, a second terminal of electrically conducting material for said protector that has a disc thereon disposable within the other end of said tubular casing, and a plurality of fusible elements of electrically conducting material extending between and connected to said discs of the first said and said second terminals, a yielding seal between the periphery of the first said disc and the inner surface of said tubular casing, and a yielding seal between the periphery of the second said disc and the inner surface of said tubular casing, said yielding seals being O-rings that coact with said casing and said discs on said terminals to confine flame and hot gases that form when said fusible elements "blow."

6. A protector for electric circuits that comprises a tubular casing, a terminal of electrically conducting material for said protector that has a disc thereon disposable within one end of said tubular casing, a second terminal of electrically conducting material for said protector that has a disc thereon disposable within the other end of said tubular casing, and a plurality of fusible elements of electrically conducting material extending between and connected to said discs of the first said and said second terminals, a groove in the periphery of the first said disc, an O-ring in said groove that normally extends outwardly beyond said periphery, a groove in the periphery of the second said disc, and an O-ring in said groove in the second said disc that normally extends outwardly beyond said periphery of the second said disc, said O-rings being compressible to fit within said casing and coacting with said discs and said casing to confine flame and hot gases in said casing.

7. A protector for electric circuits that comprises a tubular casing, a terminal of electrically conducting material for said protector that has a disc thereon disposable within one end of said tubular casing, a second terminal of electrically conducting material for said protector that has a disc thereon disposable within the other end of said tubular casing, and a plurality of fusible elements of electrically conducting material extending between and connected to said discs of the first said and said second terminals, a yielding seal between the periphery of the first said disc and the inner surface of said tubular casing, and a yielding seal between the periphery of the second said disc and the inner surface of said tubular casing, said yielding seals between said discs and the inner surface of said tubular casing being spaced inwardly from the ends of said tubular casing.

8. A protector for electric circuits that comprises a continuous, unbroken tubular casing, a terminal of electrically conducting material for said protector that has a disc disposable within said tubular casing, said disc being adjacent and closing one end of said tubular casing but having the outer face thereof spaced inwardly of said end of said tubular casing, a second terminal of electrically conducting material for said protector that has a disc disposable within said tubular casing, said disc of said second terminal being adjacent and closing the opposite end of said tubular casing but having the outer face thereof spaced inwardly of said opposite end of said tubular casing, whereby said ends of said tubular casing extend beyond said outer faces of said discs, and a plurality of fusible elements of electrically conducting material extending between and being connected to said discs in direct, heat-transferring relation, said outer faces of said discs being exposed to provide a large heat radiating area at each end of said protector but being spaced inwardly of said ends of said casing to partially protect said outer faces from contact with nearby metal objects.

9. A protector for electric circuits that comprises a tubular casing, a terminal of electrically conducting material for said protector that has a disc disposable within said tubular casing, said disc being adjacent one end of said tubular casing but having the outer face thereof spaced inwardly of said end of said tubular casing, a second terminal of electrically conducting material for said protector that has a disc disposable within said tubular casing, said disc of said second terminal being adjacent the opposite end of said tubular casing but having the outer face thereof spaced inwardly of said opposite end of said tubular casing, whereby said ends of said tubular casing extend beyond said outer faces of said discs, and a plurality of fusible elements of electrically conducting material extending between and being connected to said discs, and peripherally extending sealing rings that engage said discs and said casing and form a seal therebetween.

10. A protector for electric circuits that comprises a terminal of electrically conducting material that has a transversely extending disc at one end thereof, a second terminal of electrically conducting material that has a transversely extending disc at one end thereof, said discs having faces thereof in confronting relation, a plurality of fusible elements of electrically conducting material that extend between said confronting faces of said discs of said terminals, said fusible elements being spaced apart and being distributed over substantially the entire areas of said confronting faces of said discs of said terminals, solder that engages said fusible elements and said confronting faces of said discs of said terminals and thereby maintains said fusible elements and said terminals in electrically conducting relation, said fusible elements and said solder being substantially free of stress, a casing telescoped over and enclosing said faces of said discs of said terminals and telescoped over and enclosing said fusible elements and said solder, and arc-quenching material of small particle size that fills said casing and that contacts said fusible elements and said faces of said discs of said terminals, said arc-quenching material constituting a large absorbing mass that can equalize local pressures in said casing during the "blowing" of said fusible elements as by absorbing gases and vaporized metal.

11. A protector for electric circuits that comprises a terminal of electrically conducting material that has a transversely extending disc at one end thereof, a second terminal of electrically conducting material that has a transversely extending disc at one end thereof, said discs having faces thereof in confronting relation, a plurality of fusible elements of electrically conducting material that extend between said confronting faces of said discs of said terminals, said fusible elements being spaced apart and being distributed over substantially the entire areas of said confronting faces of said discs of said terminals, solder that engages said fusible elements and said confronting faces of said discs of said terminals and thereby maintains said fusible elements and said terminals in electrically conducting relation, said fusible elements and said solder being substantially free of stress, a casing telescoped over and enclosing said faces of said discs of said terminals and telescoped over and enclosing said fusible elements and said solder, arc-quenching material of small particle size that fills said casing and that contacts said fusible elements and said faces of said discs of said terminals, said arc-quenching material constituting a large absorbing mass that can equalize local pressures in said casing during the "blowing" of said fusible elements as by absorbing gases and vaporized metal, an opening in the disc of one of said terminals for the introduction of said arc-quenching material after said casing has been telescoped over said fusible elements and over said discs of said terminals, and a plug which releasably seals said opening in the disc of said one terminal.

12. A protector for electric circuits that comprises a terminal of electrically conducting material that has a transversely extending disc at one end thereof, a second terminal of electrically conducting material that has a transversely extending disc at one end thereof, said discs having faces thereof in confronting relation, a plurality of fusible elements of electrically conducting material that extend between said confronting faces of said discs of said terminals, said fusible elements being spaced apart and being distributed over substantially the entire areas of said confronting faces of said discs of said terminals, solder that engages said fusible elements and said confronting faces of said discs of said terminals and thereby maintains said fusible elements and said terminals in electrically conducting relation, said fusible elements and said solder being substantially free of stress, a casing telescoped over said faces of said discs of said terminals and telescoped over and enclosing said fusible elements and said solder, and arc-quenching material of small particle size that fills said casing and that contacts said fusible elements and said faces of said discs of said terminals, said arc-quenching material constituting a large absorbing mass that can equalize local pressures in said casing during the "blowing" of said fusible elements as by absorbing gases and vaporized metal, a portion of said arc-quenching material being a material that can fuse in the presence of an electrical arc, said portion of said arc-quenching material being in engagement with one end of each of said fusible elements and with the disc of the adjacent terminal, a second portion of said arc-quenching material being a material that can evolve a vapor in the presence of an electric arc, said second portion of said arc-quenching material being in engagement with the opposite end of each of said fusible elements and with the disc of the adjacent terminal.

13. A protector for electric circuits that comprises a terminal of electrically conducting material with a massive transversely extending disc at one end thereof, a second terminal of electrically conducting material with a massive transversely extending disc at one end thereof, said terminals having the said discs thereof in confronting relation, a fusible element that extends between and is secured to the confronting surfaces of said discs, said fusible element having two portions of reduced cross section that are spaced apart along the length of said fusible element a distance greater than the distance between either of said reduced cross section portions and the disc adjacent that reduced cross section portion, a mass of alloying material overlying one of said reduced cross section portions of said fusible element, a plurality of similar fusible elements extending between and secured to said discs, a casing that telescopes over said fusible elements and said discs, an amorphous arc-quenching material of small particle size engaging and contacting one of said discs and also engaging and contacting the said one reduced cross section portions of said fusible elements and the alloying material thereon, and a granular material that can fuse in the presence of an electrical arc and that engaging and contacting the other of said discs and also engaging and contacting the other reduced cross section portions of said fusible elements, said granular material and the disc adjacent said other reduced cross section portions of said fusible elements absorbing heat from said other reduced cross section portions of said fusible element to avoid the "blowing" of said other reduced cross section portions of said fusible elements on long continued overloads that can cause alloying of said alloying material with the said one reduced cross section portions of said fusible elements.

14. A protector for electric circuits that can be incorporated in an electrical bus bar system and that comprises a terminal of electrically conducting material with a flat securing portion and a disc that extends transversely of said securing portion, said securing portion of said terminal being wider than it is thick so the sides thereof are narrower than the top and bottom thereof, a second terminal of electrically conducting material with a flat securing portion and a disc that extends transversely of said securing portion, said securing portion of said second terminal being wider than it is thick so the sides thereof are narrower than the top and bottom thereof, said discs of said terminals projecting outwardly beyond said sides and said tops and bottoms of said terminals, fusible elements of electrically conducting material that extend between and are secured to said discs of said terminals, a casing of insulating material that telescopes over and encloses said fusible elements and said discs of said terminals, and fasteners of electrically conducting material that secure said casing to said discs of said terminals, said fasteners being spaced around the periphery of said casing, said fasteners being disposed in those portions of the periphery of said casing that are intermediate said sides of said securing portions and a center line that is perpendicular to said tops and said bottoms of said securing portions of said terminals, whereby the portions of the periphery of said casing that are in register with said sides of said securing portions and with said line are continuous and uninterrupted.

15. A protector for electric circuits as claimed in claim 14 wherein the exterior surfaces of said fasteners are covered with insulating material.

16. A protector for electric circuits as claimed in claim 14 wherein said fasteners are screws that extend through countersunk openings in said casing and wherein the heads of said screws are covered with insulating material.

17. A protector for electric circuits that comprises a tubular casing, a terminal of electrically conducting material for said protector that has a disc thereon disposable within one end of said tubular casing, a second terminal of electrically conducting material for said protector that has a disc thereon disposable within the other end of said tubular casing, and a plurality of fusible elements of electrically conducting materials extending between and connected to said discs of the first said and said second terminals, a groove in the disc of the first said terminal, openings in the disc of the first said terminal, a groove in the disc of said second terminal, openings in the disc of said second terminal, openings in said casing that are in register with said openings in said discs and that receive fasteners, and O-rings that are disposed in said grooves in said discs of said terminals and that engage and form a seal with the inner surface of said casing, said grooves being disposed axially inwardly of said openings in said discs of said terminals.

18. A protector for electric circuits that comprises a tubular casing which has smooth, cylindrical interior surfaces at the ends thereof, a terminal of electrically conducting material for said protector that has a portion thereof disposed within one end of said tubular casing and in register with one of said smooth, cylindrical interior surfaces, a second terminal of electrically conducting material for said protector that has a portion thereof disposed within the other end of said tubular casing and in register with the other of said smooth, cylindrical interior surfaces, and a fusible element of electrically conducting material extending between and connected to said portions of the first said and said second terminals, a yielding seal between the periphery of the said portion of the first said terminal and the said one smooth, cylindrical interior surface of said tubular casing, and a yielding seal between the periphery of the said portion of said second terminal and the inner surface of said tubular casing said other smooth, cylindrical interior.

References Cited in the file of this patent

UNITED STATES PATENTS

| | | |
|---|---|---|
| 1,140,953 | Cole | May 25, 1915 |
| 1,278,893 | Eustice | Sept. 17, 1918 |
| 1,400,660 | Cole | Dec. 20, 1921 |
| 1,604,477 | Ogle | Oct. 26, 1926 |
| 1,936,803 | Slepian et al. | Nov. 28, 1933 |
| 1,953,011 | Cote | Mar. 27, 1934 |
| 2,195,147 | Griffith | Mar. 26, 1940 |
| 2,209,823 | Lohausen | July 30, 1940 |
| 2,251,409 | Klein | Aug. 5, 1941 |
| 2,492,006 | Raybould | Dec. 20, 1949 |
| 2,653,203 | Kozacka | Sept. 22, 1953 |
| 2,665,348 | Kozacka | Jan. 5, 1954 |
| 2,670,418 | Kozacka | Feb. 23, 1954 |
| 2,681,398 | Kozacka et al. | June 15, 1954 |
| 2,683,200 | Matthysse | July 6, 1954 |

FOREIGN PATENTS

| | | |
|---|---|---|
| 514,278 | Great Britain | Nov. 3, 1939 |
| 563,600 | Great Britain | Aug. 22, 1944 |
| 809,420 | France | Dec. 12, 1936 |